United States Patent
Joshi et al.

(10) Patent No.: US 11,557,153 B2
(45) Date of Patent: Jan. 17, 2023

(54) SPOOF DETECTION USING IRIS IMAGES

(71) Applicant: Jumio Corporation, Palo Alto, CA (US)

(72) Inventors: Yash Joshi, Kansas City, MO (US); Srikanth Parupati, Framingham, MA (US)

(73) Assignee: Jumio Corporation, Palo Alto, CA (US)

( * ) Notice: Subject to any disclaimer, the term of this patent is extended or adjusted under 35 U.S.C. 154(b) by 0 days.

(21) Appl. No.: 17/333,626

(22) Filed: May 28, 2021

(65) Prior Publication Data

US 2021/0357671 A1 Nov. 18, 2021

Related U.S. Application Data

(62) Division of application No. 16/172,546, filed on Oct. 26, 2018, now Pat. No. 11,023,756.

(51) Int. Cl.
*G06V 40/40* (2022.01)
*G06F 21/32* (2013.01)
(Continued)

(52) U.S. Cl.
CPC .............. *G06V 40/45* (2022.01); *G06F 21/32* (2013.01); *G06F 21/6209* (2013.01); *G06V 40/19* (2022.01); *H04N 5/33* (2013.01)

(58) Field of Classification Search
CPC .......... G06F 21/32; G06F 3/013; G06F 16/00; G06F 21/34; G06F 3/011; G06F 3/017;
(Continued)

(56) References Cited

U.S. PATENT DOCUMENTS 9,245,173 B2 * 1/2016 Lee .................... G06K 9/00281
9,704,250 B1 * 7/2017 Shah ......................... G06T 7/55
(Continued)

FOREIGN PATENT DOCUMENTS

CN 10513 8996 12/2015

OTHER PUBLICATIONS

Czajka et al., "Presentation Attack Detection for Iris Recognition: An Assessment of the State-of-the-Art," ACM Computing Surveys, Jun. 2018, 51(4):1-35.
(Continued)

*Primary Examiner* — Golam Sorowar
(74) *Attorney, Agent, or Firm* — Patent Law Works LLP (57) ABSTRACT

The technology described in this document can be embodied in a method for preventing access to a secure system based on determining a captured image to be of an alternative representation of a live person. The method includes capturing an image of a subject illuminated by an infrared (IR) illumination source, and extracting, from the image, a portion representative of an iris of the subject. The method also includes determining that an amount of high-frequency features in the portion of the image satisfies a threshold condition indicative of the image being of an alternative representation of a live person, and in response, identifying the subject in the image to be an alternative representation of a live person. Responsive to identifying the subject in the image to be an alternative representation of a live person, the method further includes preventing access to the secure system.

20 Claims, 6 Drawing Sheets

(51) Int. Cl.
*G06F 21/62* (2013.01)
*H04N 5/33* (2006.01)
*G06V 40/19* (2022.01)

(58) Field of Classification Search
CPC ........ G06F 21/31; G06F 21/645; G06F 21/78; G06F 2221/031; G06F 3/012; G06F 3/016; G06F 3/0304; G06F 3/0482; G06F 11/1464; G06F 16/122; G06F 16/188; G06F 16/435; G06F 16/583; G06F 1/1626; G06K 9/00288; G06K 9/00899; G06K 9/00906; G06K 9/00604; G06K 9/00617; G06K 9/0061; G06K 9/00268; G06K 9/00892; G06K 9/00228; G06K 9/00255; G06K 9/00597; G06K 9/2027; G06K 9/6202; G06K 9/00302; G06K 9/4652; G06K 9/52; G06K 9/0004; G06K 9/00087; G06K 9/00201; H04L 63/0861; H04L 12/6418; H04L 63/102; H04L 2463/141; H04L 43/026; H04L 43/16; H04L 45/08; H04L 45/20; H04L 45/74; H04L 47/40; H04L 63/0227; H04L 63/0428; H04L 63/10; H04L 63/1416; H04L 63/1458; H04L 63/1466; H04L 63/1483; H04L 63/20; H04L 69/22; G06T 2207/10024; G06T 2207/10048; G06T 7/62; G06T 2207/10152; G06T 2207/30041; G06T 7/40; G06T 7/90; G06T 2207/10016; G06T 7/20; G06T 7/97; G06T 2207/10028; G06T 2207/30201; G06T 7/521; G06T 1/0021; G06T 2207/20081; G06T 7/11; G06T 7/73; G06T 7/80; G06T 11/60
See application file for complete search history.

(56) References Cited

U.S. PATENT DOCUMENTS

| | | | |
|---|---|---|---|
| 9,810,910 B1 | 11/2017 | Park et al. | |
| 2008/0219515 A1 | 9/2008 | Namgoong | |
| 2016/0070967 A1* | 3/2016 | Du | G06K 9/00114 |
| | | | 382/124 |
| 2016/0071275 A1 | 3/2016 | Hirvonen | |
| 2017/0257770 A1 | 9/2017 | Derakhshani | |
| 2018/0025199 A1 | 1/2018 | Ryshtun et al. | |
| 2018/0349721 A1* | 12/2018 | Agrawal | G06K 9/00617 |
| 2019/0065845 A1* | 2/2019 | Xu | G06F 21/32 |
| 2019/0209052 A1 | 7/2019 | Jeanne et al. | |
| 2019/0354746 A1* | 11/2019 | Zhang | G06V 40/168 |

OTHER PUBLICATIONS

He et al., "A Fake Iris Detection Method Based on FFT and Quality Assessment," CCPR '08 Chinese Conference on Pattern Recognition, Oct. 2008, pp. 1-4.
Introduction to Biometrics, 2011 ed, Springer Science and Business Media, Jan. 2011, Chapter 4, 34 pages.
PCT International Preliminary Report on Patentability in International Application No. PCT/US2019/058148, dated Apr. 27, 2021, 10 pages.
PCT International Search Report and Written Opinion in International Application No. PCT/US2019/058148, dated Feb. 11, 2020, 17 pages.

* cited by examiner

SPOOF DETECTION USING IRIS IMAGES

CROSS-REFERENCE TO RELATED APPLICATIONS

This application is a continuation of and claims the benefit of priority of U.S. patent application Ser. No. 16/172,546, filed on Oct. 26, 2018, which is hereby incorporated by reference in its entirety.

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method for preventing access to a secure system based on determining a captured image to be of an alternative representation of a live person. The method includes capturing an image of a subject illuminated by an infrared (IR) illumination source, and extracting, from the image, a portion representative of an iris of the subject. The method also includes determining that an amount of high-frequency features in the portion of the image satisfies a threshold condition indicative of the image being of an alternative representation of a live person, and in response, identifying the subject in the image to be an alternative representation of a live person. Responsive to identifying the subject in the image to be an alternative representation of a live person, the method further includes preventing access to the secure system.

In another aspect, this document features a system that includes an image acquisition device and an image analysis engine that includes one or more processors. The image acquisition device is configured to capture an image of a subject illuminated by an infrared (IR) illumination source. The image analysis engine is configured to extract, from the image, a portion representative of an iris of the subject, determine that an amount of high-frequency features in the portion of the image satisfies a threshold condition indicative of the image being of an alternative representation of a live person, and in response, identify the subject in the image to be an alternative representation of a live person. The image analysis engine is also configured to prevent access to a secure system responsive to identifying the subject in the image to be an alternative representation of a live person.

In another aspect, this document features one or more machine-readable storage devices that includes machine-readable instructions configured to cause one or more processing devices to execute various operations. The operations include capturing an image of a subject illuminated by an infrared (IR) illumination source, extracting, from the image, a portion representative of an iris of the subject, and determining that an amount of high-frequency features in the portion of the image satisfies a threshold condition indicative of the image being of an alternative representation of a live person. The operations also include responsive to determining that the amount of high-frequency features in the portion of the image satisfies the threshold condition, identifying the subject in the image to be an alternative representation of a live person, and in response, preventing access to the secure system.

In another aspect, this document features another method for preventing access to a secure system based on determining a captured image to be of an alternative representation of a live person. The method includes capturing a first image of a subject illuminated by an infrared (IR) illumination source, capturing a second image of the subject without using the IR illumination source, and extracting, from each of the first image and the second image, corresponding portions representative of an iris of the subject. The method also includes determining, for the first image and the second image, a first metric and a second metric, respectively, the first and second metrics being indicative of a sharpness of the corresponding images. The method further includes determining that a difference between the first metric and the second metric satisfies a threshold condition indicative of the image being of an alternative representation of a live person, and in response, identifying the subject in the image to be an alternative representation of a live person. The method also includes preventing access to the secure system responsive to identifying the subject in the image to be an alternative representation of a live person.

In another aspect, this document features a system that includes one or more image acquisition devices and an image analysis engine that includes one or more processing devices. The one or more image acquisition devices are configured to capture a first image of a subject illuminated by an infrared (IR) illumination source, and a second image of the subject without using the IR illumination source. The image analysis engine is configured to extract, from each of the first image and the second image, corresponding portions representative of an iris of the subject, and determine, for the first image and the second image, a first metric and a second metric, respectively. The first and second metrics are indicative of a sharpness of the corresponding images. The image analysis engine is also configured to determine that a difference between the first metric and the second metric satisfies a threshold condition indicative of the image being of an alternative representation of a live person, and in response, identify the subject in the image to be an alternative representation of a live person. The image analysis engine is also configured to prevent access to the secure system responsive to identifying the subject in the image to be an alternative representation of a live person.

In another aspect, this document features one or more machine-readable storage devices that includes machine-readable instructions configured to cause one or more processing devices to execute various operations. The operations include capturing a first image of a subject illuminated by an infrared (IR) illumination source, capturing a second image of the subject without using the IR illumination source, and extracting, from each of the first image and the second image, corresponding portions representative of an iris of the subject. The operations also include determining, for the first image and the second image, a first metric and a second metric, respectively, the first and second metrics being indicative of a sharpness of the corresponding images. The operations further include determining that a difference between the first metric and the second metric satisfies a threshold condition indicative of the image being of an alternative representation of a live person, and in response, identifying the subject in the image to be an alternative representation of a live person. The operations also include preventing access to the secure system responsive to identifying the subject in the image to be an alternative representation of a live person.

Implementations of the above aspects can include one or more of the following features. Determining that the amount of high frequency features in the portion of the image satisfies the threshold condition can include determining that the amount of high frequency features is less than a threshold amount associated with images of live persons. A frequency domain representation can be generated from the portion, and a determination can be made, from the frequency domain representation, that the amount of high frequency features in the portion of the image satisfies the threshold condition. A determination can be made that an amount of energy in a high frequency region of the frequency domain representation is less than a threshold amount associated with images of live persons; and in response, the subject in the image can be identified as an alternative representation of a live person. The alternative representation of a live person can include a photograph of the live person. The photograph can be printed on paper, or presented on a display device. Determining that the amount of high frequency features in the portion of the image satisfies the threshold condition can include processing the image using a machine learning process trained to discriminate between images of live persons and corresponding alternative representations of the live persons. The frequency domain representation can include a two-dimensional Fast Fourier Transform (2D-FFT) of the portion of the image. A determination may be made that the amount of high frequency features in the portion of the image fails to satisfy the threshold condition, and in response, the subject in the image can be identified as a live person. In response to identifying the subject in the image to be a live person, an authentication process can be initiated to determine if the live person is authorized to access the secure system. The secure system can include a user-interface disposed in a kiosk. The IR illumination source can be disposed on the kiosk.

Various implementations described herein may provide one or more of the following advantages. Reliability and/or security of a biometric authentication system can be improved by allowing the system to discriminate between live persons and alternative representations such as photographs displayed on paper or display devices. By allowing a biometric authentication system to discriminate between an image of a live person and an image of a spoof alternative representation, additional processing can be preemptively terminated, thereby creating an additional layer of security. In some cases, the technology described herein allows for implementing a spoof detection system while reducing requirements for additional hardware. This in turn in some cases, can reduce costs associated with the underlying biometric authentication system.

Repeat use of reference characters in the present specification and drawings is intended to represent same or analogous features or elements.

DETAILED DESCRIPTION

This document presents an image analysis method in which an image captured using an image acquisition device of a biometric authentication system is analyzed to determine if the image corresponds to an actual live person, or to an alternative representation (e.g., a photograph or another image of the live person printed on paper, or displayed on a high definition display device) of the live person. If the captured image is not determined to correspond to a live person, any further processing of the captured image by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether the captured image corresponds to an actual live person or a spoof alternative representation such as a printed or displayed image/photograph of the live person. Upon detecting that the captured image is a spoof, any further processing of the image to allow access to the corresponding secure system can be prevented, thereby adding an added layer of security to the system.

Figure 1:
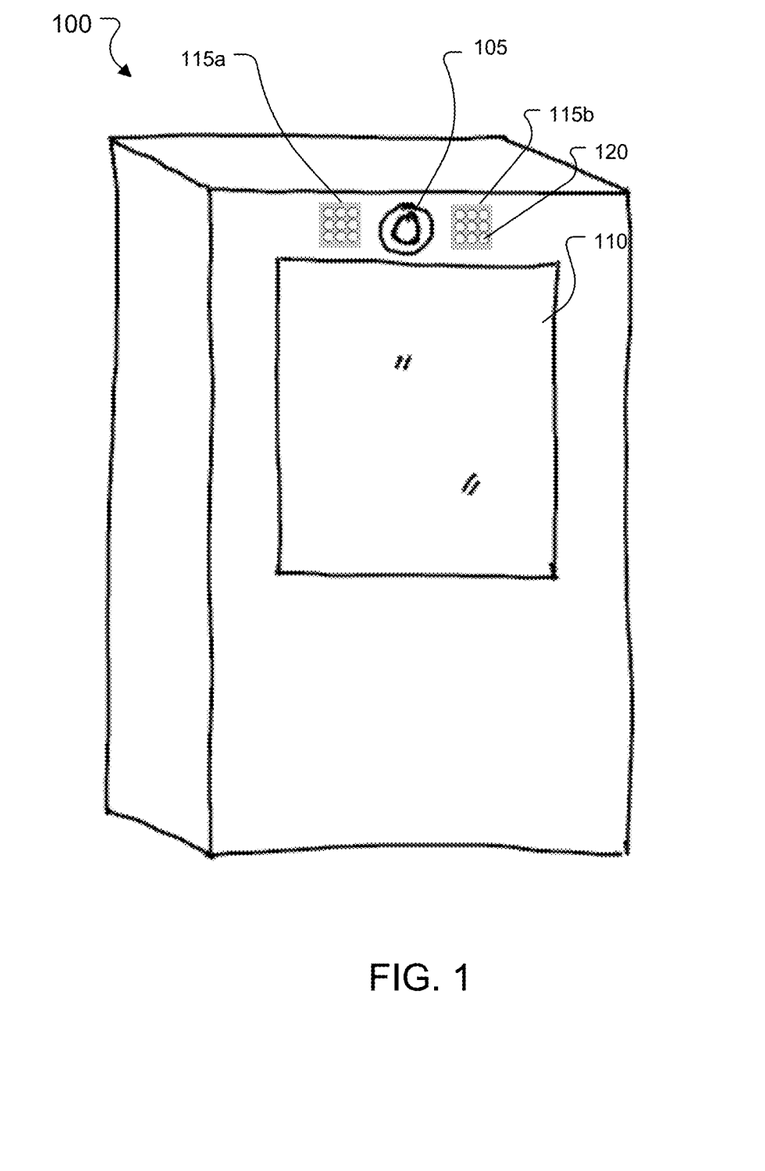
FIG. 1 shows a kiosk machine as an example environment in which the technology described herein may be used.

FIG. 1 shows a kiosk machine 100 as an example environment in which the technology described herein may be used. Such kiosk machines may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, as described in more detail below, the kiosk 100 can include one or more light sources 115a and 115b (115, in general) configured to generate electromagnetic radiation in the infrared (IR) wavelength range. The kiosk 100 can also include an infrared camera 105 or a camera that is configured to capture images of objects reflecting infrared light. IR camera 105 captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the IR camera 105 for authentication. The images captured using the camera 105 may then be used to authenticate/identify/verify a pre-stored profile for the user, and the payment for the food may then be automatically deducted from an account linked to the profile.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the camera 105 are used to authenticate/identify/verify a user, and provide access to accounts/privileges associated with the identity of the user. For example, one or more images captured by the camera 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

In some implementations, the kiosk 100 includes light sources 115 configured to generate electromagnetic radiation in the infrared (IR) wavelength range, for illuminating the subject of the images being captured by the IR camera 105. In some implementations, the IR light sources 115 may include one or more illumination sources 120. In some implementations, some illumination sources 120 can be configured to radiate IR light and some illumination sources 120 can be configured to radiate visible light (e.g., using light-emitting diodes (LEDs)) to illuminate the subject of the images being captured by camera 105. In some implementations, the wavelength ranges radiated by the illumination sources 120 can include the visible spectrum of about 400-700 nm, the NIR spectrum of about 700-1400 nm, and/or near-UV wavelengths in the 320-400 nm range. While the example in FIG. 1 shows two illumination sources 115 that are physically separated along a horizontal direction, more or fewer illumination sources 115 may also be used.

The technology described herein can be used to differentiate between an image of a live person and that of an alternative representation of a live person by analyzing portions of the images that represent the iris, as captured under IR illumination. The iris of a live person includes cavities and raised structures that, when captured by the IR camera 105 (shown in FIG. 1), produce an image that shows the rich texture of the iris. For example, the iris cavities may scatter and/or absorb the IR light and the raised structures may reflect the IR light that is captured by an image sensor of the IR camera 105. Such differential absorption/scattering, which results in a large number of features in an image of the iris of a live person, does not occur from the surface of paper or a display device. Accordingly, such features are not present in images of alternative representations of the live person captured under IR illumination, and this can therefore be used to differentiate between an image of a live person and an image of an alternative representation of a live person. Such features include edges or areas that have a marked change in pixel intensity. In other words, the iris portions of IR images of a live person are likely to exhibit large number of high-frequency components, whereas such high frequency components are likely to be absent in IR images of alternative representations.

The presence/absence of high frequency components in an IR image can be detected, for example, using various image processing techniques. In some implementations, an edge detection process can be executed on a captured IR image, and the amount of edges present in the iris portion of the image can be used to determine whether or not the image is that of a live person. In some implementations, the captured IR image (with or without a pre-processing step such as edge detection) can be subjected to a frequency domain transformation, and an amount of energy present in the high-frequency regions corresponding to the iris portions can be used to determine whether the image corresponds to that of a live person. For example, the annular iris portion can be extracted from the IR image, unwrapped into a rectangular image, and then subjected to a frequency domain transform such as a two-dimensional Fast Fourier Transform (2D-FFT) or a wavelet transform. The amount of energy in the high frequency portions of the resulting frequency domain representation can then be used to determine whether or not the image corresponds to that of a live person. For example, if the high-frequency regions of the frequency domain representations include more than a threshold fraction (e.g., about 60%) of the total amount of energy of the iris image, the IR image can be determined to be from a live person.

Figure 2A:
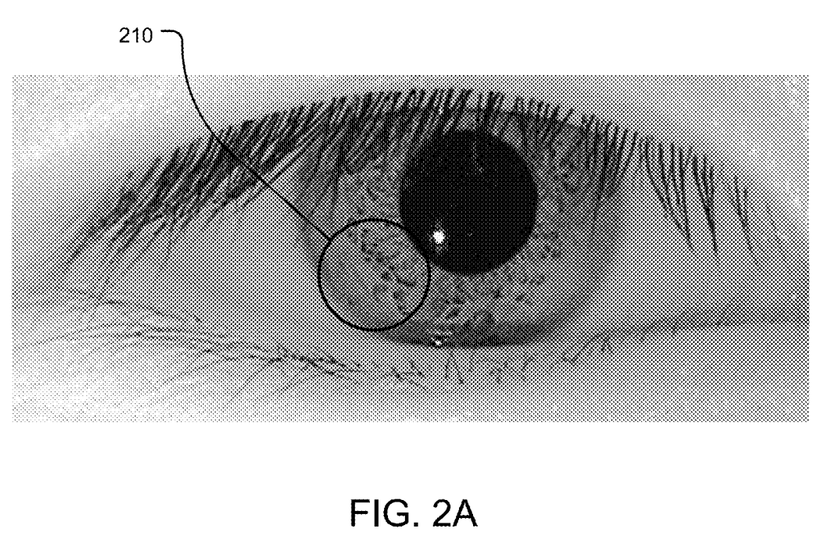
FIG. 2A shows an example of an image of an iris of a live person captured under infrared illumination.
Figure 2B:
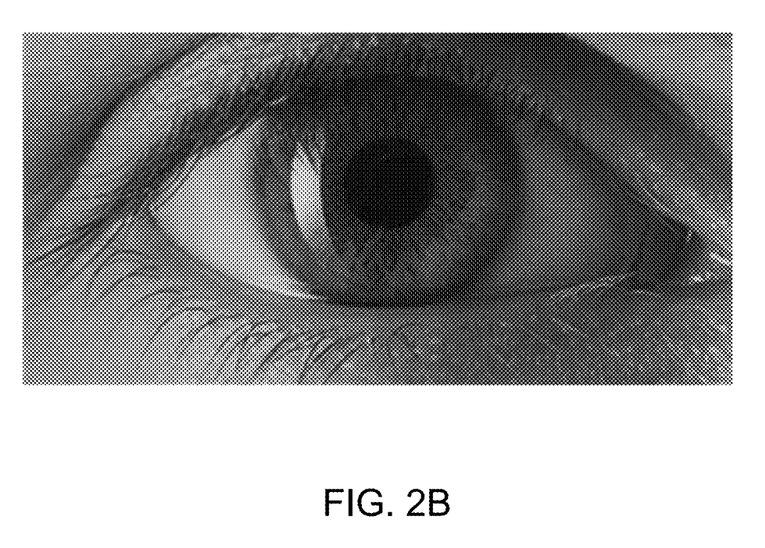
FIG. 2B shows an example of an image of an iris of an alternative representation of a live person—a photograph printed on paper—captured under infrared illumination.

If the camera 105 captures an image of an alternative representation of the live person (e.g., a photograph of the person printed on paper) onto which IR light is radiated, a representation of such cavities and structures may not be detectable, or may be present in an amount considerably less than that expected for an image of a live person. Such differences are illustrated in FIGS. 2A and 2B, which show an example of an IR image of an eye (including the iris region) of a live person, and an example of an IR image of a photograph of an eye (including the iris region) printed on paper, respectively. As seen in FIG. 2A (for example, within the circular area 210), the iris portion of the image of a live person includes marked edges representative of the cavities and raised regions formed by the iris tissue. However, as illustrated by FIG. 2B, an image of a photograph printed on paper includes few if any of such marked edges. Rather, as shown in FIG. 2B, the iris portion of the IR image of a paper photograph includes less high-frequency features as compared to the image of the live person. These differences can be leveraged to discriminate between images of live persons and images of alternative representations of live persons using the technology described herein.

In some implementations, the spoof detection technique can be made even more robust by capturing two separate images of the iris—e.g., an IR image (with an IR light source turned on) and an RGB image (with the IR light source turned off)—and comparing the two images to discriminate between live persons and alternative representations. On comparing the RGB image and the IR image, significant differences in the sharpness of the iris structures can be observed in the case of a live person. On the other hand, the differences in the sharpness of the iris structures between the RGB image and the IR image for a high quality alternative representation (e.g., high resolution image printed on high quality paper) can be negligible. The nature of differences between the RGB image and the IR image of the iris can therefore be used to differentiate between live persons and spoof alternative representations. The sharpness of the iris structures in the RGB and IR images can be determined using various pixel-domain and frequency domain image processing techniques. For example, sharpness of the structures can be measured in the pixel domain by determining rise distances of edges, or in the frequency domain using a spatial frequency response.

Figure 3:
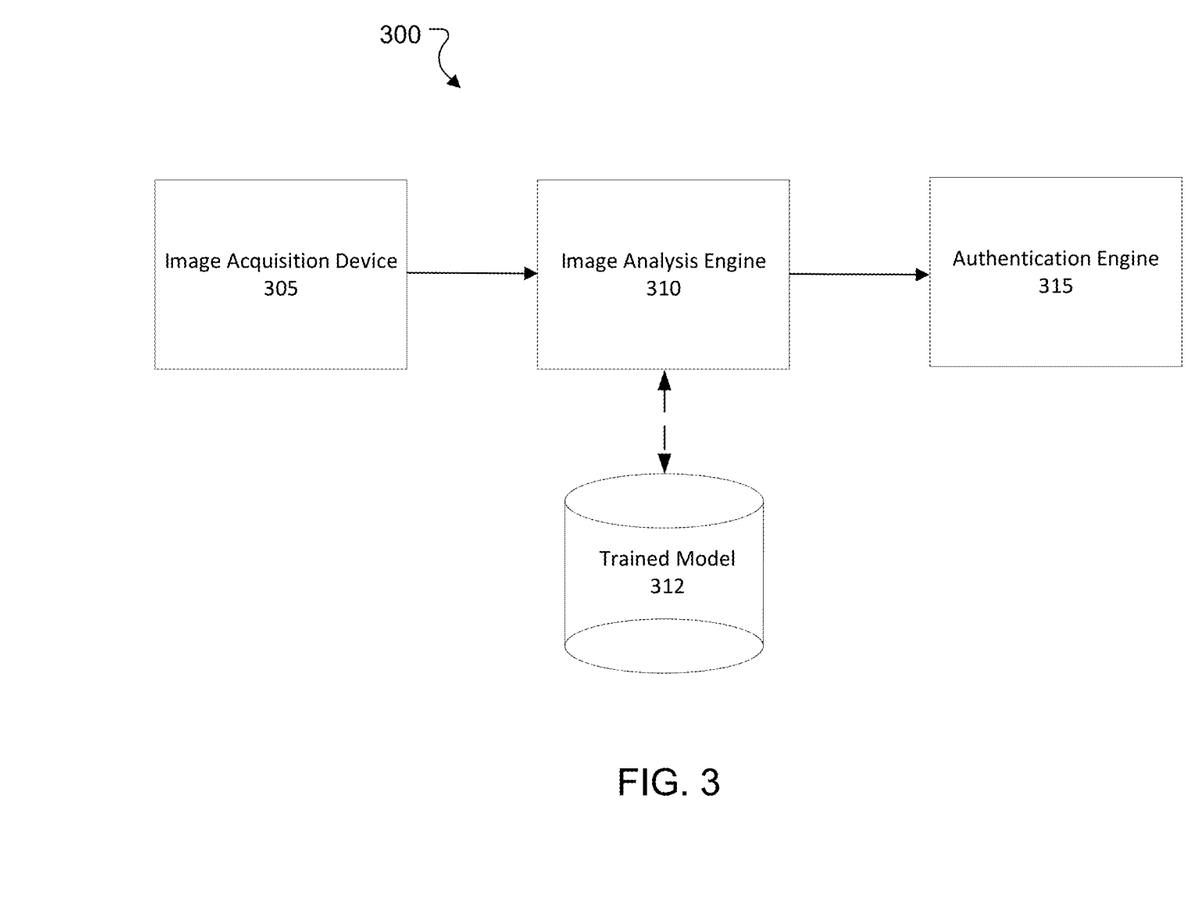
FIG. 3 is a block diagram of an example system usable for implementing the technology described herein.

FIG. 3 shows an example system 300 for analyzing images captured under IR light to determine if the iris images are of live persons or spoof alternatives of live persons. The system 300 can also be used to capture images under IR and non-IR illumination, and compare iris portions of the image to determine if the captured images are of a live person or a spoof alternative of a live person. For example, the system 300 can be configured to capture an IR image and an RGB image of a subject, and analyze the sharpness of the iris features in the two images to determine whether the subject is a live person or a spoof alternative representation such as a high quality image of a person printed on high quality paper. The system 300 includes an image acquisition device 305 configured to capture images of subjects. In some implementations, the image acquisition device 305 includes an IR camera substantially similar to the IR camera 105 described with reference to FIG. 1. The image acquisition device 305 can also include an infrared light source. In some implementations, the infrared light source associated with the image acquisition device 305 can be substantially similar to the light sources 115 described above with reference to FIG. 1. In some implementations, the image acquisition device includes one or more processing devices configured to generate digital data from the captured images.

The system 300 also includes an image analysis engine 310 that can be configured to analyze images captured by the image acquisition device 305. In some implementations, the image analysis engine 310 is configured to receive digital representations of images captured by the image acquisition device 305 and determine whether or not the images correspond to that of a live person. In some implementations, the image analysis engine 310 includes an analog to digital converter (ADC) to generate digital image data from information (e.g., sensor output) received from the image acquisition device 305. The image analysis engine includes one or more processing devices configured to execute various image analysis processes, including the processes described herein.

In some implementations, the image analysis engine 310 may reside on a computing device (e.g., a server) that is at a remote location with respect to the image acquisition device and/or the authentication engine 315. For example, the image acquisition device 305 can be disposed at a kiosk 100 that communicates over a network with a remote server on which the image analysis engine 310 executes. The image analysis engine 310 can in turn provide an output of the analysis to the authentication engine 315 residing on the kiosk 100. In some implementations, the authentication engine 315 can also reside on a remote server (e.g., the same server one which the image analysis engine 310 resides, or on a different server) and communicate the result of an authentication process to the kiosk 100.

The image analysis engine 310 can be configured to analyze the captured images in various ways, in order to determine whether or not the captured images correspond to a live person. In some implementations, the image analysis engine 310 is configured to extract a portion (e.g., extract image details with a filter) of the image and analyze the extracted portion to detect high-frequency components. For example, the image analysis engine 310 can be configured to compute a frequency domain representation (e.g., a two dimensional Fast Fourier Transform (2D FFT), a discrete cosine transform (DCT), a wavelet transform etc.) of the iris portion of an image to determine whether the iris portion of the image includes enough high-frequency components to be representative of a live person. For example, the image analysis engine 310 can be configured to determine what percentage of the energy content of the iris portion of the image is in a high-frequency region, and determine based on that percentage, whether or not the image can be considered to be from a live person. Referring back to FIG. 2A, the iris portion of an IR image of a live person is likely to include a large amount of marked edges, and this in turn results in a high percentage of high-frequency components. On the other hand, as illustrated by FIG. 2B, an IR image of a spoof alternative representation is likely to have a relatively low percentage of high-frequency components (unless it's a high quality IRIS image printed on the high quality paper). The threshold percentage used to determine whether or not an image is that of a live person can depend on various factors. In some implementations, the threshold percentage can be empirically determined based on comparing frequency contents of images of live persons and images of spoof alternative representations of live persons. In some implementations, the threshold is selected as 60%, such that an image is flagged as spoof if less than 60% energy of the image is in the high frequency spectrum.

To determine that an amount of high-frequency components in the iris portion is above or below a certain threshold, the captured image may be pre-processed to extract a portion of the image. For example, the image analysis engine 310 can be configured to execute one or more image processing processes to extract the annular region corresponding to the iris. The annular portion may then be unwrapped to generate a rectangular representation of the iris, which is then used in subsequent processing. In some implementations, the image analysis engine 310 can be configured to execute an edge detection process to identify high frequency components in the iris portion of the image. The edge detection process can include, for example, high-pass filtering followed by one or more post-processing steps, e.g., to enhance the contrast between adjoining areas of the image with variation in brightness or darkness.

In some implementations, the image analysis engine 310 can be configured to execute a machine learning process to discriminate between iris portions of IR images of a live person and iris portions of IR images of alternative representations of live persons. In such cases, the image analysis engine can access a trained model 312, which has been trained using a learning corpus that includes both types of images. In some implementations, using a machine learning process may improve the performance of the image analysis engine 310 by reducing the false positive rate and/or the false negative rate. In some implementations, the trained model 312 can be trained to account for spoofs presented on various types of papers and display devices.

Figure 4A:
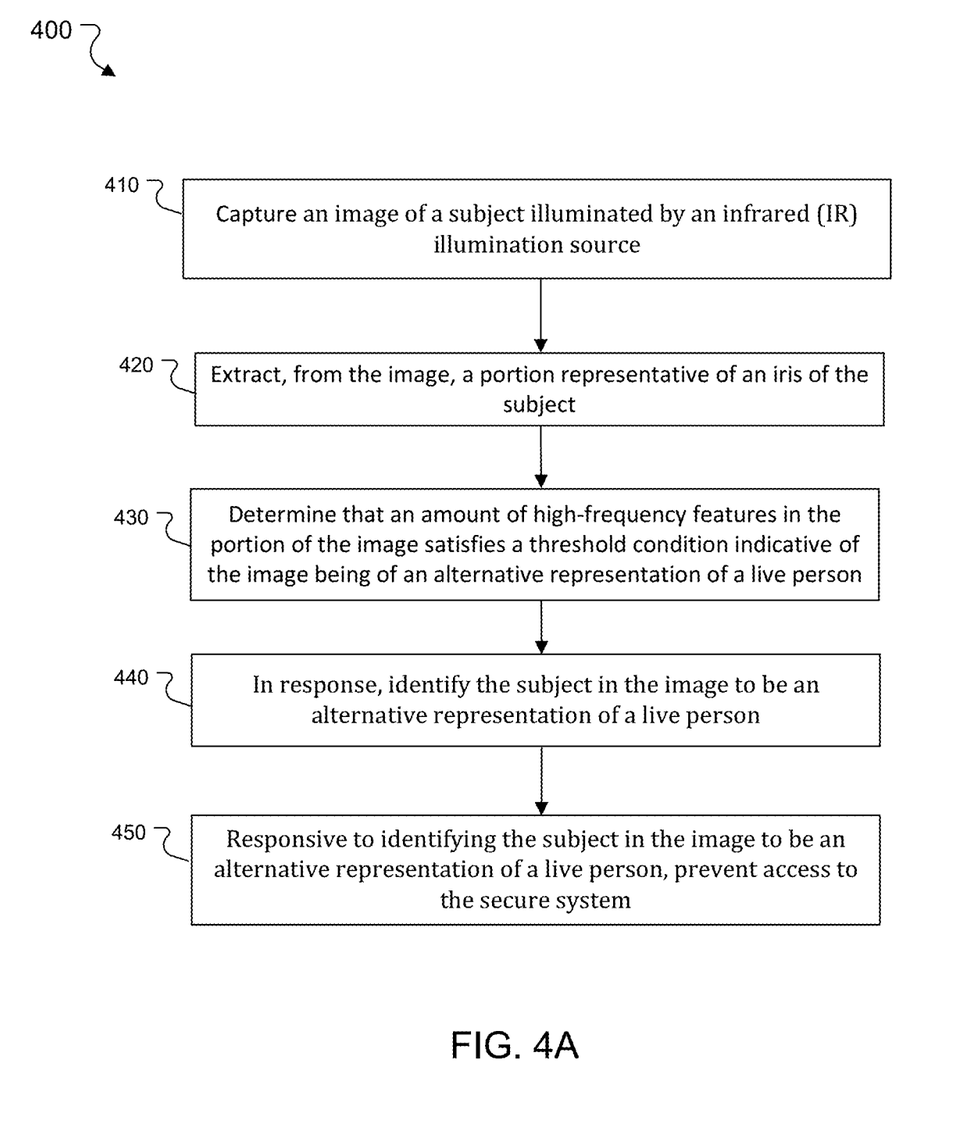
FIG. 4A is a flowchart of an example process for preventing access to a secure system based on determining a captured image to be of an alternative representation of a live person.

FIG. 4A is a flowchart of an example process 400 for preventing access to a secure system based on determining a captured image to be of an alternative representation of a live person. In some implementations, at least a portion of the process 400 may be executed by one or more processing devices disposed within a kiosk such as the kiosk 100 described with reference to FIG. 1. In some implementations, at least a portion of the process 400 may be executed by the image analysis engine 310, which may be disposed within a kiosk, or at one or more servers (such as servers or computing devices in a distributed computing system) in communication with remote components such as one or more processing devices disposed within a kiosk.

Operations of the process 400 includes capturing an image of a subject illuminated by an infrared (IR) illumination source (410). The IR light source can be disposed, for example, as a part of the illumination source 115 as described above with reference to FIG. 1. In some implementations, the light source array can be disposed in another device such as a smartphone, wherein the spoof detection process described herein is used to prevent unauthorized access to the smartphone.

Operations of the process 400 also includes extracting, from the image, a portion representative of an iris of the subject (420). In some implementations, a portion of the image can be extracted by first obtaining an annular portion representing the iris, and executing an unwrapping process to convert the annular portion to a rectangular depiction of the iris. The extracted portion may then be treated as a separate image for subsequent processing.

Operations of the process 400 further includes determining that an amount of high-frequency features in the portion of the image satisfies a threshold condition indicative of the image being of an alternative representation of a live person (430), and in response identifying the subject in the image to be an alternative representation of a live person (440). The alternative representation of a live person can include a photograph of the live person. The photograph can be printed on paper, or displayed on a display device such as the screen of a mobile device. Determining that the amount of high frequency features in the portion of the image satisfies the threshold condition can include determining that the amount of high frequency features is less than a threshold amount associated with images of live persons. In some implementations, this can include generating, from the portion, a frequency domain representation, and determining, from the frequency domain representation, that the amount of high frequency features in the portion of the image satisfies the threshold condition. In some implementations, the frequency domain representation can include a two-dimensional Fast Fourier Transform (2D-FFT) of the portion of the image. This in turn can include determining that an amount of energy in a high frequency region of the frequency domain representation is less than a threshold amount associated with images of live persons, and in response, identifying the subject in the image to be an alternative representation of a live person. In some implementations, determining that the amount of high frequency features in the portion of the image satisfies the threshold condition can include processing the image using a machine learning process trained to discriminate between images of live persons and corresponding alternative representations of the live persons.

Operations of the process 400 also includes preventing, responsive to identifying the subject in the image to be an alternative representation of a live person, access to the secure system (450). In some implementations, where a user-interface of the secure system is disposed as a part of a kiosk, identifying a captured image to be a spoof can prevent an access attempt made through the kiosk. On the other hand, if a determination is made that the image does not satisfy the threshold condition indicative of the image being of an alternative representation of a live person (e.g., a printed picture), the subject in the image can be identified as a live person, and an authentication process for determining if the live person is authorized to access the secure system is initiated. In other words, if the captured image includes sufficient high frequency components indicative of a live person, the subject in the image can be identified as a live person, and an authentication process is initiated. This can be done, for example, using an authentication system substantially similar to the authentication engine 315 described above with reference to FIG. 3. If such an authentication engine authenticates the live person to access the secure system (e.g., a user account or privileges associated with the access attempt), the live person is allowed to continue the interaction with the corresponding user interface (e.g., a kiosk or a smartphone).

Figure 4B:
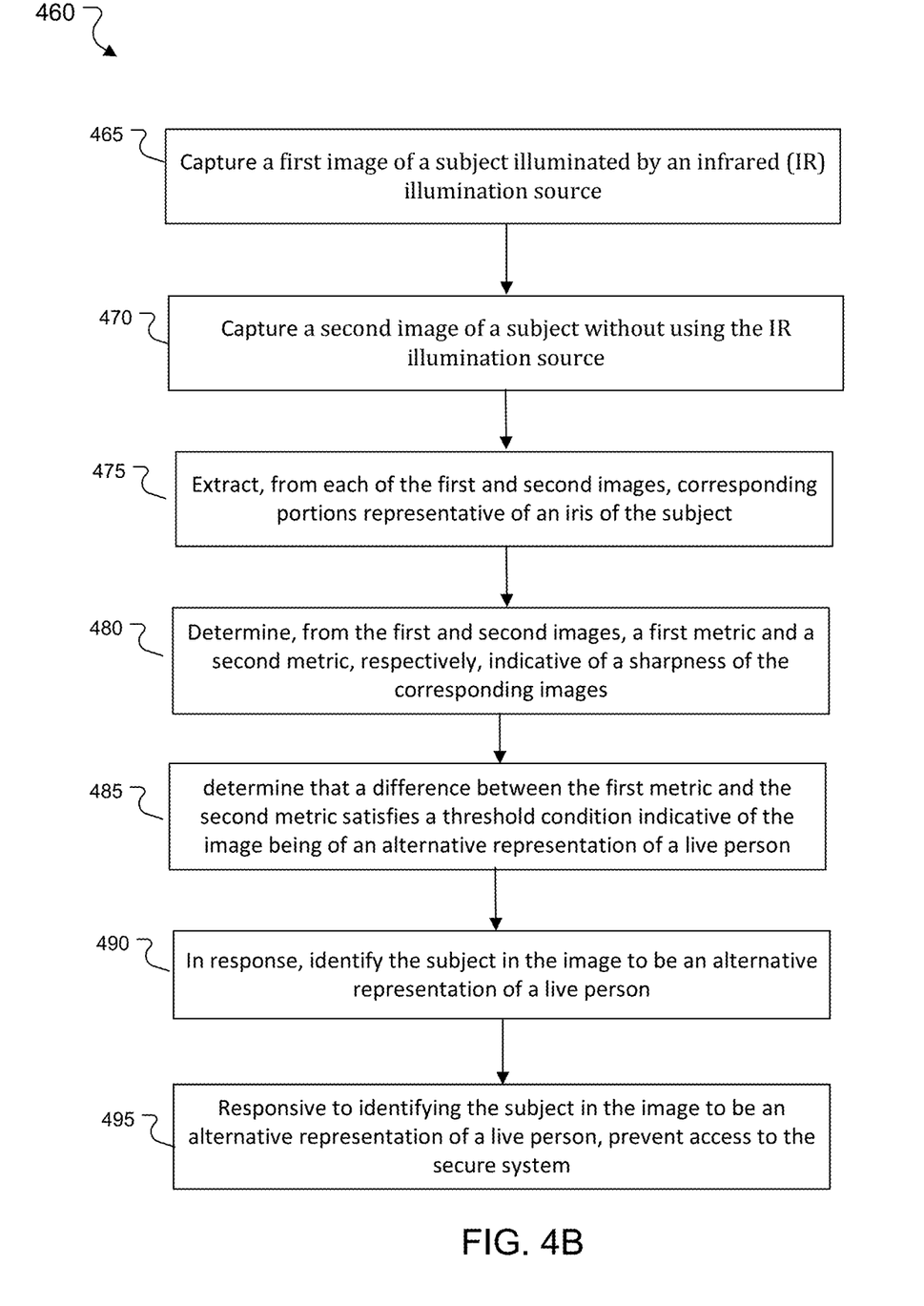
FIG. 4B is a flowchart of another example process for preventing access to a secure system based on determining a captured image to be of an alternative representation of a live person.

FIG. 4B is a flowchart of another example process 460 for preventing access to a secure system based on determining a captured image to be of an alternative representation of a live person. In some implementations, at least a portion of the process 460 may be executed by one or more processing devices disposed within a kiosk such as the kiosk 100 described with reference to FIG. 1. In some implementations, at least a portion of the process 460 may be executed by the image analysis engine 310, which may be disposed within a kiosk, or at one or more servers (such as servers or computing devices in a distributed computing system) in communication with remote components such as one or more processing devices disposed within a kiosk.

Operations of the process 460 includes capturing a first image of a subject illuminated by an IR illumination source (465) and capturing a second image of the subject without using the IR illumination source (470). The IR light source can be disposed, for example, as a part of the illumination source 115 as described above with reference to FIG. 1. In some implementations, the light source array can be disposed in another device such as a smartphone, wherein the spoof detection process described herein is used to prevent unauthorized access to the smartphone. The first image and the second image can be captured by the same image acquisition devices (e.g., an IR camera), or different image acquisition devices. In some implementations, separate non-IR illumination sources can be used for capturing the second image. In some implementations, the second image can be captured using ambient light. In some implementations, the first image can be an IR image and the second image can be an RGB image.

Operations of the process 460 also includes extracting, from each of the first and second images, corresponding portions representative of an iris of the subject (475). In some implementations, the corresponding portions of the images can be extracted by first obtaining an annular portion representing the iris, and executing an unwrapping process to convert the annular portion to a rectangular depiction of the iris. The extracted portions may then be treated as a separate images for subsequent processing.

Operations of the process 460 further includes determining, from the first and second images, a first metric and a second metric, respectively (480). The first and second metrics are indicative of a sharpness of the corresponding images. The metrics may be calculated using various pixel-domain and frequency domain image processing techniques. For example, sharpness of the structures can be measured in the pixel domain by determining rise distances of edges, or in the frequency domain using a spatial frequency response.

Operations of the process 460 also includes determining that a difference between the first metric and the second metric satisfies a threshold condition indicative of the image being of an alternative representation of a live person (485), and in response, identifying the subject in the image to be an alternative representation of a live person (490). In some implementations, significant differences in the sharpness of the iris structures in the two images can be observed in the case of a live person. On the other hand, the differences in the sharpness of the iris structures in the two images for a high quality alternative representation (e.g., high resolution image printed on high quality paper) can be negligible. The threshold can be determined, for example, experimentally, or using a machine learning process.

Operations of the process 460 also includes preventing, responsive to identifying the subject in the image to be an alternative representation of a live person, access to the secure system (495). This operation can be substantially similar to that described above with respect to operation 450 of process 400 (FIG. 4A).

Figure 5:
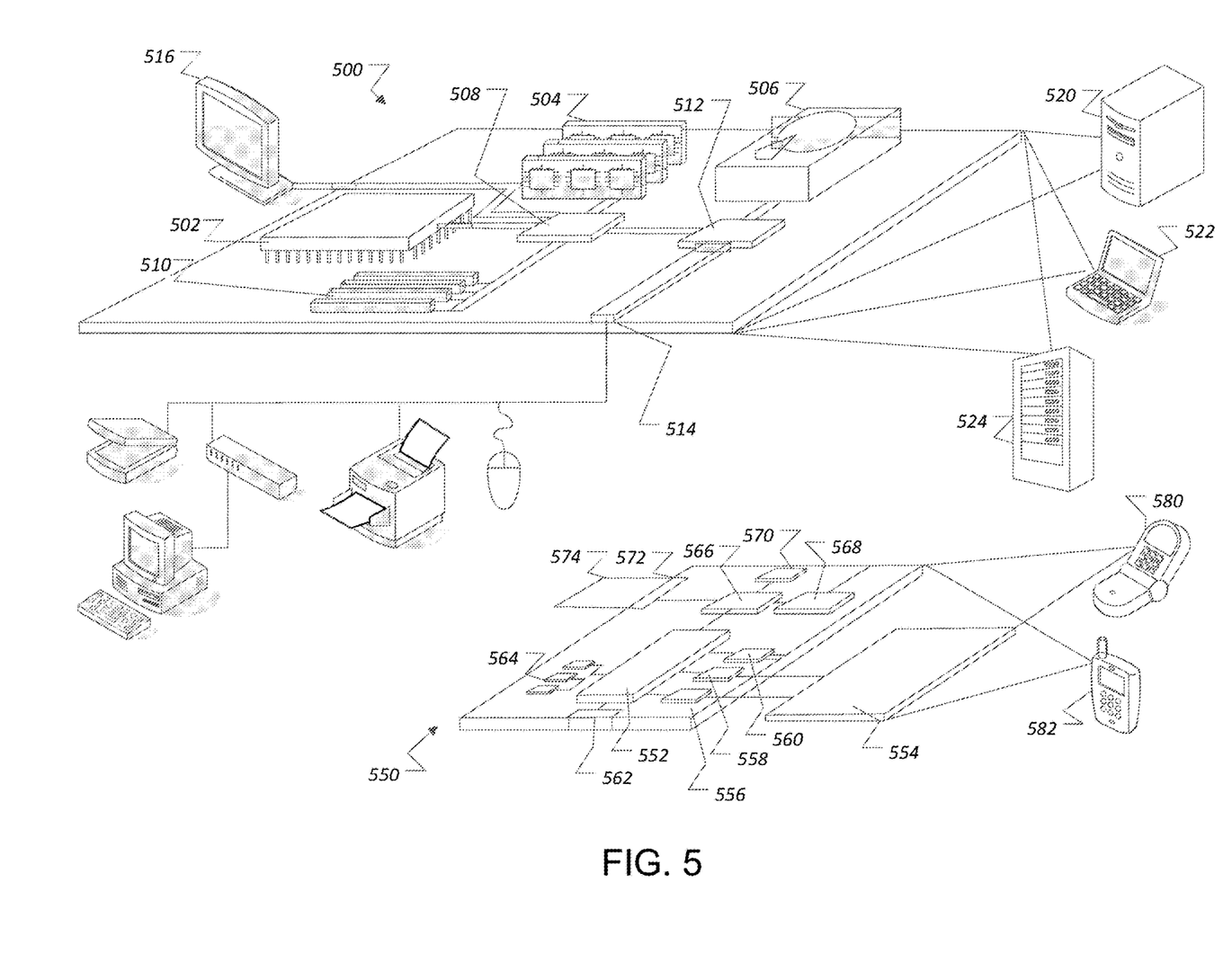
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method comprising:
   capturing a first image of a subject illuminated by an infrared illumination source, wherein the first image comprises an infrared light image;
   capturing a second image of the subject, wherein the second image comprises a visible light image;
   extracting, from each of the first image and the second image, corresponding portions representative of an iris of the subject;
   determining, for the first image and the second image, a first metric and a second metric, respectively, by generating a frequency-domain representation and measuring a pixel-domain feature of the first image and the second image, the first metric and the second metric indicative of a sharpness of the corresponding portions of the first image and the second image representative of the iris, wherein the sharpness characterizes edges in the first image and the second image, such that the pixel-domain feature comprises a rise distance of an edge;
   identifying the subject to be a live person based on determining that a difference between the first metric and the second metric satisfies a threshold condition, wherein the threshold condition is based on predetermined differences in sharpness between visible light images of human irises and infrared light images of human irises; and
   responsive to identifying the subject in the first image and the second image to be a live person, executing an authentication process for the subject by authorizing or preventing access to a secure system.

2. The method of claim 1, wherein determining a difference between the first metric and the second metric comprises analyzing the pixel-domain features of the first image and the second image to satisfy a threshold condition indicative of the image being of an alternative representation of a live person and in response, identifying a subject of the image to be the alternative representation of the live person.

3. The method of claim 2, wherein extracting comprises obtaining an annular portion representative of the iris, and executing an unwrapping process to convert the annular portion to a rectangular depiction of the iris.

4. The method of claim 1, wherein determining the sharpness of the corresponding portions of the first metric and the second metric comprises analyzing frequency-domain features of the first image and the second image.

5. The method of claim 4, wherein the frequency-domain representation comprises a spatial frequency response.

6. The method of claim 1, wherein the authentication process comprises authorizing or preventing access to the secure system implemented in a kiosk.

7. The method of claim 6, wherein the infrared illumination source is disposed on the kiosk.

8. A system comprising:
   an image acquisition device comprising an infrared (IR) illumination source; and
   an image analysis engine comprising one or more processing devices, the image analysis engine configured to perform operations comprising:
      causing the image acquisition device to capture a first image of a subject illuminated by the IR illumination source, wherein the first image comprises an infrared light image;
      causing the image acquisition device to capture a second image of the subject, wherein the second image comprises a visible light image;
      extracting, from each of the first image and the second image, corresponding portions representative of an iris of the subject;
      determining, for the first image and the second image, a first metric and a second metric, respectively, by generating a frequency-domain representation and measuring a pixel-domain feature of the first image and the second image, the first metric and the second metric being indicative of a sharpness of the corresponding portions of the first image and the second image representative of the iris, wherein the sharpness characterizes edges in the first image and the second image, such that the pixel-domain feature comprises a rise distance of an edge;
      identifying the subject to be a live person based on determining that a difference between the first metric and the second metric satisfies a threshold condition, wherein the threshold condition is based on predetermined differences in sharpness between visible light images of human irises and infrared light images of human irises; and
      responsive to identifying the subject in the first image and the second image to be a live person, executing an authentication process for the subject by authorizing or preventing access to a secure system.

9. The system of claim 8, wherein determining a difference between the first metric and the second metric of the first image and the second image that satisfies a threshold condition is indicative of the image being of an alternative representation of a live person and in response, identifying a subject of the image to be the alternative representation of the live person.

10. The system of claim 9, wherein the extracting comprises obtaining an annular portion representative of the iris, and executing an unwrapping process to convert the annular portion to a rectangular depiction of the iris.

11. The system of claim 8, wherein determining the sharpness of the corresponding portions of the first metric and the second metric comprises analyzing frequency-domain features of the first image and the second image.

12. The system of claim 11, wherein the frequency-domain representation comprises a spatial frequency response.

13. The system of claim 8, wherein executing the authentication process comprises authorizing or preventing access to the secure system of implemented in a kiosk.

14. The system of claim 13, wherein the image acquisition device is disposed on the kiosk.

15. One or more non-transitory, machine-readable storage devices comprising machine-readable instructions that, when executed by one or more processing devices, cause the one or more processing devices to execute operations comprising:
   obtaining a first image of a subject, wherein the first image comprises an infrared light image captured as the subject is illuminated by an infrared illumination source;
   obtaining a second image of the subject, wherein the second image comprises a visible light image;
   extracting, from each of the first image and the second image, corresponding portions representative of an iris of the subject;
   determining, for the first image and the second image, a first metric and a second metric, respectively, by generating a frequency-domain representation and measuring a pixel-domain feature of the first image and the second image, the first metric and the second metric being indicative of a sharpness of the corresponding portions of the first image and the second image representative of the iris, wherein the sharpness characterizes edges in the first image and the second image, such that the pixel-domain feature comprises a rise distance of an edge;
   identifying the subject to be a live person based on determining that a difference between the first metric and the second metric satisfies a threshold condition, wherein the threshold condition is based on predetermined differences in sharpness between visible light images of human irises and infrared light images of human irises; and
   responsive to identifying the subject in the first image and the second image to be a live person, executing an authentication process for the subject by authorizing or preventing access to secure system.

16. The non-transitory, machine-readable storage devices of claim 15, wherein determining a difference between the first metric and the second metric comprises of the first image and the second image that satisfies a threshold condition is indicative of the image being of an alternative representation of a live person and in response, identifying a subject of the image to be the alternative representation of the live person.

17. The non-transitory, machine-readable storage devices of claim 16, wherein the extracting comprises obtaining an annular portion representative of the iris, and executing an unwrapping process to convert the annular portion to a rectangular depiction of the iris.

18. The non-transitory, machine-readable storage devices of claim 15, wherein determining the sharpness of the corresponding portions of the first metric and the second metric comprises analyzing frequency-domain features of the first image and the second image.

19. The non-transitory, machine-readable storage devices of claim 18, wherein the frequency-domain representation comprises a spatial frequency response.

20. The non-transitory, machine-readable storage devices of claim 15, wherein the authentication process comprises authorizing or preventing access to the secure system of a kiosk.

* * * * *